United States Patent [19]

Lagadec et al.

[11] Patent Number: 4,821,298

[45] Date of Patent: Apr. 11, 1989

[54] METHOD AND APPARATUS FOR REPRODUCING DIGITIZED SIGNALS

[75] Inventors: Roger Lagadec, Rumlang; Julien Piot, Rolle, both of Switzerland

[73] Assignee: Willi Studer, AG, Regensdorf, Switzerland

[21] Appl. No.: 683,429

[22] Filed: Dec. 19, 1984

[30] Foreign Application Priority Data

Dec. 19, 1983 [CH] Switzerland .................. 6741/83
Jul. 3, 1984 [CH] Switzerland .................. 3196/84

[51] Int. Cl.$^4$ ............................................. H04B 1/66
[52] U.S. Cl. .................................. 375/122; 358/261.1; 382/56
[58] Field of Search .................. 375/122, 37; 340/347 DD; 358/260, 261; 382/56, 54; 360/53

[56] References Cited

U.S. PATENT DOCUMENTS

| | | | |
|---|---|---|---|
| 3,895,184 | 7/1975 | Komura et al. | 358/260 |
| 4,011,399 | 3/1977 | Tsuchiya et al. | 358/261 |
| 4,097,903 | 6/1978 | Nakagome et al. | 358/261 |
| 4,107,648 | 8/1978 | Frank | 358/261 |
| 4,115,815 | 9/1978 | Nakagome | 340/347 DD |
| 4,212,036 | 7/1980 | Nakagome | 358/261 |
| 4,229,768 | 10/1980 | Kûrahayashi et al. | 358/261 |
| 4,414,580 | 11/1983 | Johnson et al. | 358/260 |
| 4,534,059 | 8/1985 | Yamada | 382/54 |
| 4,539,691 | 9/1985 | Ogawa et al. | 375/37 |
| 4,596,039 | 6/1986 | Mitchell et al. | 382/56 |
| 4,610,027 | 9/1986 | Anderson et al. | 382/56 |

Primary Examiner—Benedict V. Safourek
Assistant Examiner—Stephen Chin
Attorney, Agent, or Firm—Helfgott & Karas

[57] ABSTRACT

To compensate for transmission errors of a non-ideal system for transmitting digital signals, first signal deviations are determined and stored, and then there is a direct processing of the input signals into output signals by combining the input signals with the stored signal deviations. The invention includes both method and apparatus and provides a substantial reduction in equipment costs.

18 Claims, 3 Drawing Sheets 0 0 1 1 1 1 0 0 0 0 1 1 1 0 0 1 0 0
FIG. 1
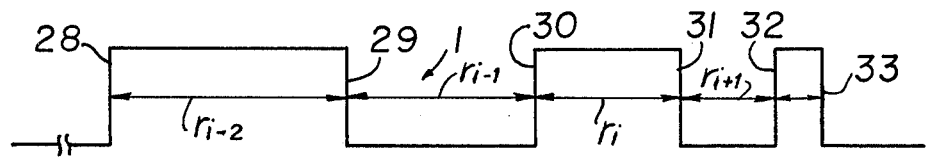
FIG. 2
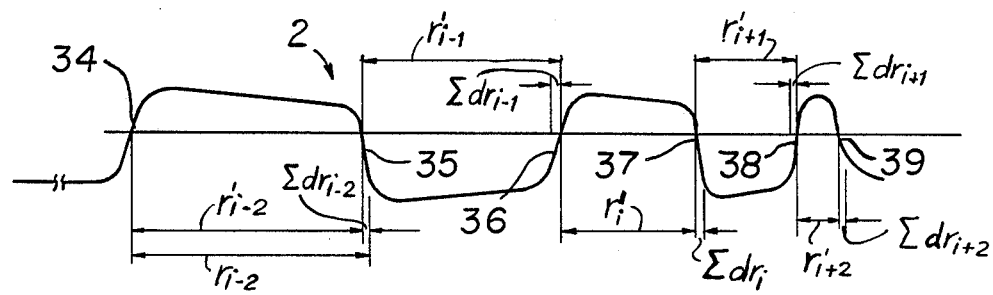
FIG. 3
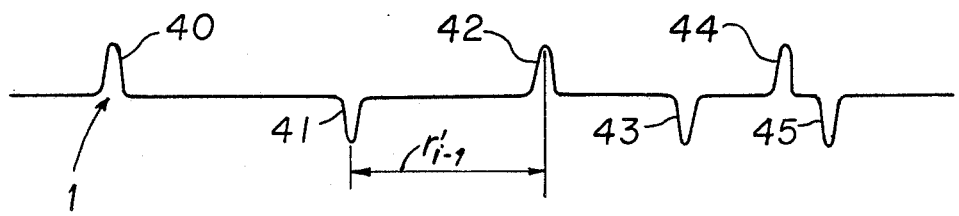
FIG. 4
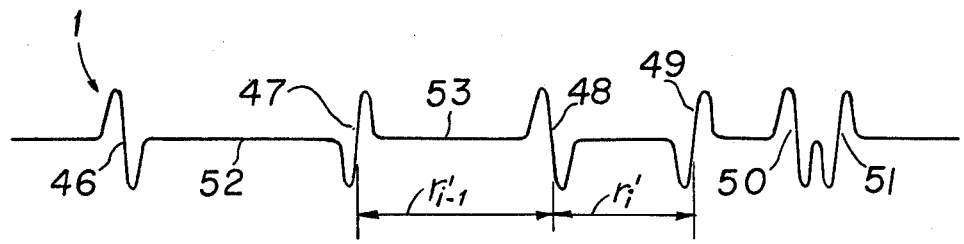
FIG. 5

METHOD AND APPARATUS FOR REPRODUCING DIGITIZED SIGNALS

FIELD OF THE INVENTION

The present invention relates to reproducing a digitized signal, in which the amplitudes of the individual scanning pulses representing the digitized signal are recorded in binary form. Prior to recording, these binary signals, which consist of single pulses, are treated by means of a run-length code. The invention also relates to an apparatus for performing this method.

BACKGROUND OF THE INVENTION

As is known, analog signals can be digitized by scanning their pattern with a specific frequency, so that pulses are obtained with an amplitude corresponding to the deflection of the information signal at the time of the particular scan. The numerical value of the amplitude of the scanning pulse is then converted into binary form and said binary signal is recorded on the particular record support. When reproducing a signal recorded in this way, the binary values of the amplitudes of the successively following scanning pulses are converted back into the corresponding analog pattern of the information signal.

The transition from level 0 or −1 to level +1 in the binary signal can be considered as the rising front of a single pulse in the binary signal. The transitions from level +1 to level 0 or −1 can be looked upon as the falling front of the single pulse. The binary signal, which reproduces the numerical value of the amplitude of one of the scanning pulses, normally contains several such single pulses and consequently also transitions between the −1 and +1 levels. The length located in the binary signal between two transitions is referred to hereinafter as the "run length" or just as "signal". A run length may comprise only a single bit or several directly succeeding bits or bit positions of the same level and/or value 0 or 1. Thus, the run length also gives the duration of the individual pulses in the binary signal.

If in a single binary signal, several single pulses succeed one another, wherein each comprises only one or only a few bit positions, then the time interval between the rising front and the falling front of the single pulse, i.e., the duration of the particular single pulse, is very short. The shorter the run length of the single pulse, the greater the demands on the width of the frequency spectrum to be transmitted by the system.

When recording the binary amplitudes of scanning pulses, problems occur if a binary-expressed numerical value of the amplitude of a scanning pulse has a frequent change of level between 0 and/or −1 and +1. In such a binary signal, the run lengths of the single pulses are short. In the case where such a signal is to be recorded, the pulse ratio is high and the demands made on the necessary frequency width of the system are correspondingly high. If the system does not have the necessary frequency width, then the single pulses are reproduced in distorted form in the binary form of the scan value.

In order to obviate this and other problems, the binary-expressed values of the amplitudes of the scanning pulses to be recorded are treated on the basis of a run-length code. A large number of such codes are known. One of the purposes for using such a code is that if the single pulses are short, the binary form is transformed in accordance with a given rule. In addition, if the single pulse happens to be large, the code can cause the time interval between its edges or sides to be reduced, in order to save space on the record support. One such run-length code called HDM-1 (cf J. Audio Eng. Soc., Vol. 31, No. 4, 1983, pp. 228–234) provides run lengths or edge spacings between 1.5 T and 4.5 T, which can be varied in 0.5 T steps. T is the time or correspondingly the length necessary for recording s single bit cell of said code.

Certain problems occur when reproducing a binary signal recorded in this way. For example, the edges of a response or a single pulse in the reproduced binary signal has a finite instead of an infinite steepness. The 0 crossings of the edges in a single pulse of a reproduced binary signal can then, in certain circumstances, have a different spacing from one another than in the single pulse to be recorded. In addition, the phase response in the reproduced signal is not linearly dependent on the frequency. Thus, equalizers are used in the known reproduction systems for the purpose of improving the behavior of the reproduction electronics in the case of a step and/or phase response. Such equalizers deal with the incoming signals as analog signals. In principle, they are analog filters, which must be adapted to the parameters of the recording system (such as, e.g., tape speed, recording head characteristics, tape characteristics, etc).

In such known reproduction electronics, the equalizer is followed by a device for measuring the run length of the particular single pulse (step responses or 0 crossings), together with a circuit for quantifying the measured run lengths.

The primary disadvantage of this known reproduction electronics is essentially that the construction of such systems with equalizers is complicated. Furthermore, as stated, such systems must be set to specific parameters, and this setting procedure is labor-intensive. Further, if the parameters are modified, then resetting is necessary. In addition, several equalizers are often used in such systems and are connected in series and set to different values of one or more parameters of the system. However, such a solution is hardly feasible in reproduction equipment because it is prohibitively expensive and takes up an excessive amount of space in the equipment.

SUMMARY OF THE INVENTION

The present invention overcomes these disadvantages and provides method and apparatus which correct the transmission errors of a not ideally functioning system for reproducing digitized signals with limited expenditure and effort and which can be easily adapted to larger changes in the relative speed between support and reading device even in the case of recovering signals from a moving record support (tape, disk).

BRIEF DESCRIPTION OF THE DRAWINGS

The invention is described in greater detail hereinafter relative to non-limitative embodiments and with reference to the attached drawings, wherein:

FIG. 1 shows the pattern of a binary signal indicated by the symbols 0 and 1 and which reproduces the numerical value of the amplitude of one of the scanning pulses of an analog information signal, which has been treated by means of a run-length code;

FIG. 2 is a graphical representation of the signal of FIG. 1 before it is recorded on a signal support or carrier;

FIG. 3 is a representation of the signal of FIG. 2 after it has been read from a record support;

FIGS. 4 and 5 show the signal of FIG. 3, which has been processed in the reproduction means in order to be able to evaluate the interlevel transitions of the signal in the vicinity of the pulse edges;

DETAILED DESCRIPTION OF THE PREFERRED EMBODIMENTS

Figure 6:
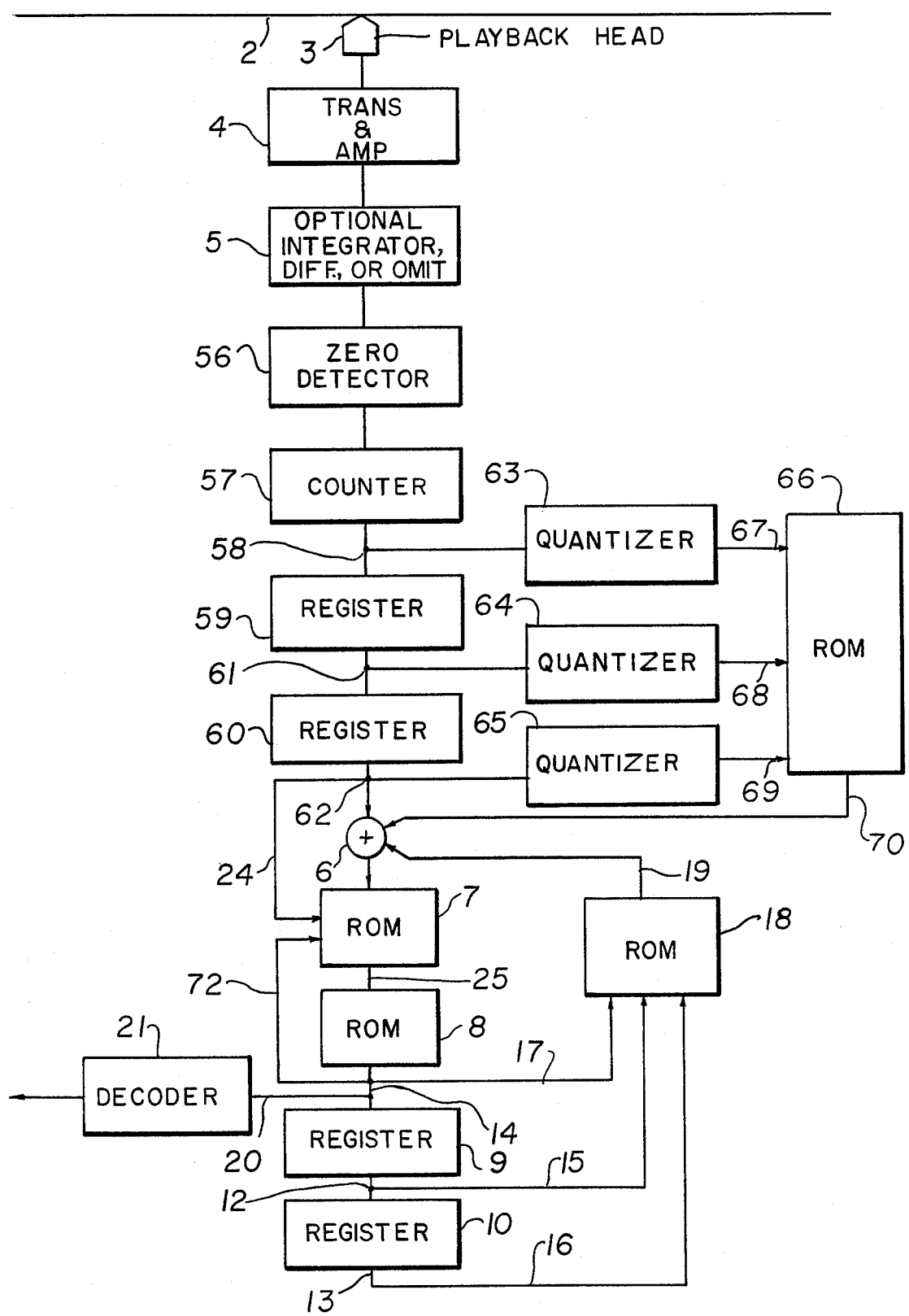
FIG. 6 shows a first embodiment of apparatus embodying the invention.

FIG. 1 shows a signal pattern in known digital form. FIG. 2 shows the same signal pattern as in FIG. 1, but expressed by a sequence of signals 28 to 33 defining several successive single pulses with run lengths, $r_{i-2}$, $r_{i-1}$, $r_i$, $r_{i+1}$, $r_{i+2}$, etc. Such run lengths are proportional to the number of 0 or 1 bits following one another in groups in accordance with the representation of FIG. 1.

FIG. 3 shows a signal pattern 2 approximately corresponding to signal pattern 1 of FIG. 2. It consists of signals 34 to 39, which define the run lengths of run lengths $r'_i$, $r'_{i-1}$, $r'_{i-2}$, $r'_{i+1}$, $r'_{i+2}$. These differ from the run lengths $r_i$, $r_{i-1}$, $r_{i-2}$, $r_{i+1}$, $r_{i+2}$, by signal deviations $dr_i$, $dr_{i-1}$, $dr_{i-2}$, $dr_{i+1}$, $dr_{i+2}$.

In FIG. 4, the run lengths are determined by signals 40 to 45, which can be any sort of digital signal represented by signals such as 28 to 33. For example, such signals 40 to 45 can appear at the output of a playback head.

Unlike the case of signals 34 to 38 according to FIG. 3 which are obtained through the integration of signals 40 to 45 of FIG. 4, signals 46 to 51 in FIG. 5 are obtained by the differentiation of signals 40 to 45 of FIG. 4.

FIGS. 2 to 5 reveal run lengths or $r_i$, $r^-_{i+n,m}, r'_i$ and $r'^-_{i+n,m}$, where n and m are positive or negative integers. The term "run length" is understood to mean the interval or time between two successive signals. The term "signal" is understood to mean a step-like signal 28, 29 as a transition between two stable levels, as shown in FIG. 2.

As can be seen from FIG. 4, a signal 40 which immediately returns to its original position is also conceivable. In such a case, the run length is considered to represent the spacing between comparable points of the signal, e.g., between maxima and minima. However, usually the signal is understood to mean the 0 crossing or the passage of a varying signal run through a predetermined level. This applies in the case of FIGS. 3 and 5. Signals 28 to 33 etc. of the signal pattern 1 according to FIG. 2 can be termed output signals, while signals 34 to 51 according to FIGS. 3, 4 and 5 can be termed input signals. This relates to the apparatus in which they are to be processed. The run length are to be understood in such a way that the portions 52 or 53 (FIG. 5) of a signal pattern are not considered to be passages or zero crossings in the aforementioned sense. This also gives a rough definition of the run length.

FIG. 6 shows part of an apparatus for reproducing digitized data or signals recorded in accordance with a run-length code on a record support, e.g., a magnetic tape 2.

It is obvious that other record supports, such as disks, memories, etc. can be used. In the case of a magnetic tape 2, the reading device is in the form of a playback head 3, past which the tape 2 is moved in per se known manner. Upstream of the playback head 3 is connected in per se known manner a voltage transformer and amplifier 4 and, e.g., an integrator 5. If an integrator 5 is connected upstream, then signals 34 to 39 according to FIG. 3 are obtained. A differentiator can also be provided in place of an integrator 5. Then, signals 46 to 51 according to FIG. 5 are obtained. Without block 5, i.e., without an integrator or a differentiator, signals 40 to 45 according to FIG. 4 are obtained.

Deviations with respect to an input signal as shown in FIG. 2 are produced within the systems or apparatuses that transmit or record and reproduce such signals. Such deviations appear because each operation or processing of the signal they carry out are performed less than ideally, as is common in all technical processes. FIG. 2 therefore shows a signal prior to its recording on tape 2 and FIG. 3 shows the same signal after its reading from tape 2 and after its integration in block 5.

The deviations can be measured by test runs. With such test runs, signals whose run lengths are known are fed into the system and the runs are measured at the output of the system. Then the input run length and the output run length are compared and a deviation may result from this comparison. In the same way it is possible to have test runs with groups of successive run lengths and the deviation of a specific run length within this group may be produced. But, as digital signals can only assume discrete values, the number of deviations to be measured is limited. The system to which such test runs may be fed is, for example, a tape recorder or other equipment capable of transmitting digital signals. But if the inventive method or apparatus is designed to reproduce signals transmitted from a tape, then to measure the deviations the test runs have to be executed with a tape recorder. Of course deviations may also be calculated. Once the deviations are known corresponding deviation values are stored in the memory by means of well known programming operations. Such test runs and such programming need to be executed only once or twice in the lifetime of an apparatus embodying the invention.

The integrator of differentiator 5 is followed by a zero detector 56, which detects the zero crossings of signals 34 to 39 or 46 to 51 and supplies the same to a counter 57, which is started and stopped by intermediate signals produced by the zero crossings. Thus, a signal corresponding to the run lengths $r'_i$ is available at output 58 and counter 57. Components such as the integrator of differentiator 5, amplifier 4, zero detector 56 and counter 57 are known per se and consequently are not described further in detail here. The same also applies to their operation in such an arrangement.

Output 58 is followed by a selectable number of registers 59, 60 for individual values of the run length $r'_{i+2}$, $r'_{i+1}$, as they appear at output 58. In the same way as output 58, outputs 61 and 62 of registers 59, 60 are connected across quantizer 63, 64 and 65 to a read-only memory (ROM) 66.

Quantifiers 63, 64 and 65 are connected to inputs 67, 68 and 69 of ROM 66. An output 70 or ROM 66, as well as the output 62 of the last register 60 are connected to a summer or adder 6. Summer 6 is followed by further ROM's 7, 8. Signal deviations $dr_i$ are stored in memory 8 and the possible output signals $r_i$, $r_{i+1}$, $r_{i+2}$, $r_{i-1}$, $r_{i-2}$ are stored in memory 8. These are followed by further register 9, 10 for the individual output signals $r_{i-1}, r_{i-2}$, etc. Outputs 12, 13, 14 of registers 8, 9, 10 are connected across lines 15, 16, 17 to a ROM 18.

Further signal deviation $dr_i$ are stored in ROM 18. An outgoing line 19 of memory 18 is connected to summer 6. Between memory 8 and memory 9, a line 20 is connected to output 14 and derives the output signals $r_i$. Conventionally, this passes into a decoding unit 21.

Figure 7:
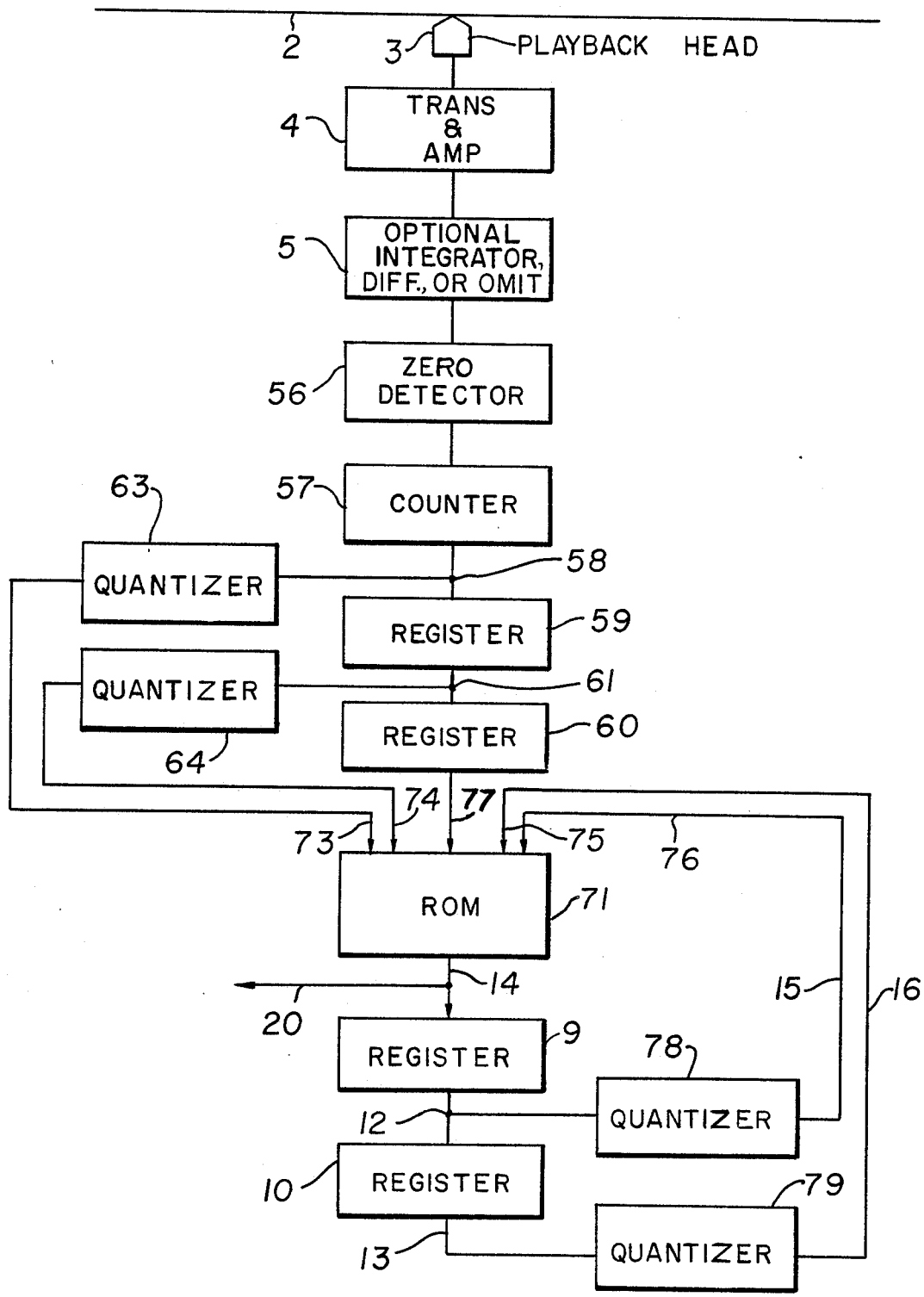
FIG. 7 shows a second embodiment of the apparatus.

FIG. 7 shows an apparatus, as in FIG. 6, in which the summers and ROM's 7 and 8 have been combined into a unit 71. The remaining components of the apparatus are identical and consequently have the same reference numerals.

In per se known manner, unit 71 comprises a ROM, in which all the signal deviations are stored. For example, unit 71 has inputs 73, 74 for succeeding run lengths, inputs 75, 76 for preceding run lengths and an input 77 for the actual or present run length. As in the construction according to FIG. 6, there is only one output 14 with line 20 connected thereto. Corrected run lengths $r_i$ appear at output 14. FIG. 7 also shows that a quantizer 78, 79 can be connected into each line 15, 16 and fulfills exactly the same function as quantizer 63, 64.

The reproduction of digitized data or signals has as a prior requirement that they have been previously recorded on an information carrier. Thus, for this purpose, it is necessary that the data or signals are recorded in the same code, for whose decoding decoding unit 21 is programmed. The per se known, but not shown, coding unit in the recording electronics of the reproduction equipment or a separate recording equipment converts the digital data or signals from a form according to FIG. 1 into a form according to FIG. 2. For example, signal 1 is stored on magnetic tape 2 as a magnetization changing between two magnetization states.

On reproduction, the signals at output 58 are fed on the one hand to register 59 and on the other to quantizer 63. For example, the run length $r'_{i+2}$ last counted by counter 57 is stored in register 59 until the counter 57 supplies a new value $r'_{i+3}$ for a run length. The value $r'_{i+2}$ on the one hand is then fed into the next register 60 and on the other hand into the quantifier 64, etc.

New values (e.g., integral values) $r''_{i+2}, r''_{i+1}, r''_i$ are associated with the values of the run lengths, e.g., $r'_{i+2}, r'_{i+1}$ and $r'_i$ in quantizer 63, 64 and 65 and said new values are subsequently fed via inputs 67, 68 and 69 into ROM 66.

In ROM 66 the values $r'_{i+2}, r'_{i+1}, r'_i$ or $r''_{i+2}, r''_{i+1}, r''_i$ are associated with the values of the signal deviations $dr_{i+2}, dr_{i+1}, dr_i$, which are stored in ROM 66 as a function of the possible values for the run lengths $r'_{i+2}, r'_{i+1}, r'_i$ or $r''_{i+2}, r''_{i+1}, r''_i$.

If a new value for a run length $r'_{i+2}, r'_{i+1}, r'_i$ appears at output 62, a value $dr_{i+2}, dr_{i+1}, dr_i$ always appears at output 70 of ROM 66. The values for the run lengths $r'_{i+2}, r'_{i+1}, r'_i$ and the values of the signal deviation $dr_{1+2}, dr_{i+1}, dr_1$ are supplied to the summer or adder 6, where they are summed with further values for the signal deviations $dr_{i-1}, dr_{i-2}$ from ROM 18 and combined to produce on output value, which is supplied to ROM 7.

ROM 7 contains signal deviations $dr_i(r_i)$ which are dependent on their own run length $r_i$. Thus, account is taken of the particular signal deviation which is a function of only its own run lengths.

In practice, run lengths $r_i$ can assume only a certain number of possible specific values. Therefore, memory 7 stores the values of the signal deviations associated with these specific run lengths which are dependent thereon. Thus, for memory 7, the input values $r'_i$ or the output values $r_i$ can be used via line 24 or 72 as addresses for the storage locations. The run lengths leaving memory 7 via line 25 are used as addresses for ROM 8, which stores the possible integral output values $r_i$ of the run lengths.

In ROM 8, the run length $r'_i$ is corrected by the signal deviation $dr_i$ (noise). The output values of the S/N-ratios $r_i$ leave ROM 8 via output 14. From there, the values of the run lengths $r_i$, pass on the one hand into decoding unit 21 and on the other into register 9. Registers 9 and 10 can in each case receive only a single value for a run length. They are connected in such a way that each value of a run length $r_i$ first passes into register 9 and then into register 10. From the outputs 12 and 13 of registers 9 and 10, the values of the run length $r_{i-1}, r_{i-2}, r_{i-3}$ are transmitted cyclically to ROM 18 via lines 15, 16, where they are used as addresses. The number of registers 9, 10 is a function of the number of values $r_{i-1}, r_{i-2} \ldots r_{i-n}$ used for determining the signal deviations.

ROM 18 stores signal deviations $dr_i$ in each case as a function of the preceding run lengths $r_{i-1}, r_{i-2}, r_{i-3}$, etc., as a function of the number of registers 9, 10, etc.

The run lengths $r_{i-1}, r_{i-2}, r_{i-3}$, read as addresses into memory 18, designate storage locations containing corresponding signal deviations $dr_{i-1}, dr_{i-2}, dr_{i-3}$.

Prior to read-out, they are again summed in memory 18 and are supplied as signal deviations $dr(r_{i-1}, r_{i-2}, r_{i-3})$ to summer 6 via line 19. They are there summed with the corresponding run length $r'_i$ and the sum is passed in per se known manner through read-only memories 7 and 8.

In the apparatus according to FIG. 6, run lengths as known from FIGS. 3 or 5, and which appear at output 58 of FIG. 6, are corrected to run lengths $r_i$ in accordance with the following formula:

$$r_i = r'_i - dr_i(\text{noise}) - dr_i(r'_{i+1}, r'_{i+2} \ldots r'_{i+m}) - dr_i(r'_i) - dr_i(r'_{i-1}, r'_{i-2}, \ldots r'_{i-n})$$

in which:

$r_i$ is the sought run length, $r'_i$ is the erroneous run length fed in, $dr_i$(noise) signifies a signal deviation as produced in components which cause noise and/or results from the measurement of the run length with finite resolution, $dr_i(r_i)$ is a signal deviation, which is dependent on the length of the run length $r_i$ or $r'_i$, $dr_i(r_{i-1}, r_{i-2}, \ldots r_{i-n})$ represents a signal deviation, which is influenced by the length of the preceding run length $r_{i-1}, r_{i-2}$, etc., $dr_i(r_{i+1}, r_{i+2}, \ldots r_{i+m})$ represents a signal deviation influenced by the length of the following run lengths $r_{i+1}, r_{i+2}$, etc.

This relationship is based on the finding that a run length or run length is influenced by the immediately preceding run length. Long run lengths in particular undergo an additional modification due to inadequate reproduction of the low frequency components. Noise and measurement with finite resolution can in each case bring about a change in the run lengths. In the case of less critical transmission channels, the run lengths can be the same as the original run lengths on the basis of an initial approximation. In certain physical reproduction systems there can be influencing of future signals by signals already in the vicinity of the reproduction system.

This means that run lengths arriving at output 58 are subsequently delayed in registers 59, 60, 7, 8, 9, and 10 and that parallel thereto there are signal deviations, whereby after a first time lag, when the run length has reached output 62, this can provide signal deviations of little or undelayed (future) run lengths and signal deviations of more greatly delayed (old) run lengths.

For all of the discrete run lengths $r_i$ that occur, signal deviations $dr_i$ are stored in the read-only memories 7, 18 and 66. If required, it is also possible to provide all those signal deviations $dr_i(r_{i-1}, r_{i-2} \ldots r_{i-n})$ or $dr_i(r_{i+1}, r_{i+2}, \ldots r_{i+m})$, which are obtained by combinations of two, three of more successive run lengths. These combinations take account of reciprocal influencing of the distortion of succeeding signals.

The apparatus according to FIG. 6 can be varied by using quantizer lines 15 and 16 as well, or by omitting quantifier 63, 64, 65. Because quantifier 65 with input 69 and line 17 serve to determine signal deviations $dr_i$ as a function of the sought run length $r_i$, it is possible to eliminate these components or memory 7 which serves the same purpose. Quantizers 63, 64, 65, ROM's 66, 18, 7, 8 and registers 59, 60, 9, 10 provided for storing a single value of a run length, together with summer 6, comprise per se known and consequently not further represented components. It will also be obvious to those expert in these arts that the complete apparatus can be controlled by instructions stored in a memory (not shown) in a particular operating cycle, which is dependent on the frequency of the input and/or output signals.

For example, quantizers 63, 64, 65 and 78, 79 are constructed in ROM form and make it possible to reduce the information flow. For example, they convert seven-bit input information into two- or three-bit output information. However, quantizers 63, 64, 65, 78, 79 can also be integrated into the programmable memories 66, 18. For example, known flip-flop circuits can be used as registers 9, 10, 59, 60.

The measurement of the run lengths in counter 57 can take place with a test frequency dependent on the speed with which an information carrier is moved while the information is being read from it. Thus, if the information carrier comprises, e.g., a magnetic tape 2, the test frequency can be coupled to the speed with which the magnetic tape 2 is moved past the playback head 3. However, it is also necessary to adapt the signal deviations $dr_i$ stored in the ROM's 7, 18 and 66 as a function of the run length $r_i, r_{i+1}, r_{i-1}$, etc.

For example, the signal deviations $dr_i(r_i)$ can be determined by test runs. It is then possible to observe how a particular signal with a known run length fed into a recording means appears at the output 58 (FIG. 6). By comparing the known run length $r_i$ at the output of a recording means and the run length $r'_i$ at output 58, it is possible to determine the signal deviation $dr_i(r_i)$ for the particular run length $r_i$. This process can then be carried out for the various provided values for $r_i$.

The same method can be performed with a signal sequence, in order to determine the signal deviation $dr_i(r_{i-1}, r_{i-2}, \ldots r_{i-n}, r_{i+1}, \ldots r_{i+m})$. The signal deviation $dr_i$ is then determined when the preceding and succeeding run lengths $r_{i-1}, r_{i+1}, r_{i-n}, r_{i+m}$ are known. As the influence of its particular own run length is known, he signal deviations $dr_i(r_i)$ and $dr_i(r_{i-1}, r_{i-2}, \ldots r_{i-n})$ or $dr_i(r_{i+1}, r_{i+2}, \ldots r_{i+m})$ can be kept apart and stored separately in memory 7 and memories 18 and 66.

If the elements through which a signal must pass in order to bring about signal deviations are known, then it is also possible to calculate the signal deviations.

The run lengths $r_i$ transmitted via line 20 can also be carriers of particular signal patterns. For example, the latter can comprise a specific sequence of given run lengths $r_i$. Such signal patterns are detected in an apparatus for reading signal patterns in a per se known and consequently not described manner.

In addition, decoding unit 21 can be constructed in such a way that the conversion of the run lengths into monovalent or non-valent bits always takes place together for the complete run length. This is possible because a run length in each case only covers non-valent or monovalent bits. This obviates the need of a conversion for each individual bit cell. A thus constructed decoding unit 21 consequently operates more slowly than when converting for each bit cell. The same operation also occurs in the apparatus according to FIG. 7.

As mentioned above, block 4, which may be an amplifier, produces signals as shown in FIG. 4. These signals may be processed in block 5. If block 5 is an integrator, the signals outputted from block 5 will correspond to the signals shown in FIG. 3. If block 5 is a differentiator, the signals outputted from block 5 will correspond to the signals shown in FIG. 5. In the case of any of the signals according to FIGS. 3, 4 and 5, those signals define run lengths. But it is easier to read the run length from signals according to FIG. 3 or 5, since those signals have zero-crossings which are easier to detect than the peaks of the signals shown in FIG. 4. Therefore, block 5 is not absolutely necessary for operation according to the invention.

As mentioned above, block 56 is a zero-crossings detector. Block 57 is a counter. This counter is started and stopped when block 56 reports to the counter that a zero-crossing or a peak has been sensed. The counts are, for example, 7-bit numbers each representing or corresponding to the run length of a pulse of the digital signal. Therefore such 7-bit values can be added to other values in summer 6.

As described above, blocks 63, 64 and 65 which represent quantizers are designed to quantify the values transmitted from the counter of block 57. That means that they may transform the input 7-bit value to a roughly corresponding 2-bit value. The reason for this operation is to save memory space.

The invention has only been explained relative to the example of a reproduction means for a recorded signal. However, it can be seen that the invention can be used wherever digital data is obtained that is distorted due to a non-ideal preceding transmission.

The advantages achieved by the invention are essentially that two previously separate processing operations, namely equalization and restoration of the original quantified run lengths can take place in the same circuit. The processing of digital signals can now take place continuously in a digital manner. There is no need for components operating in analog manner, which leads to simple, space-saving circuits.

Another advantage is the problem-free adaptation of reproduction electronics to changes in the speed of the carrier or support.

The simple manner of signal processing according to the invention leads to lower processing rates in the circuits. This increases operating reliability in the case of great loading of the apparatus. This has an especially positive effect if the signals are processed in a time multiplexing process within reproduction electronics.

A further advantage resulting from the invention is that the apparatus can be set by feeding known signals with known run lengths into recording and reproduction or playback equipment connected to the apparatus and can be taken again at the output of the reproduction part and compared with the signal fed in. This comparison leads to direct values which can be fed into the apparatus. If this process is automated, there can be automatic setting of the apparatus according to the invention.

While the invention has been described in detail above, it is to be understood that this detailed description is by way of example only, and the protection granted is to be limited only within the spirit of the invention and the scope of the following claims.

What is claimed is:

1. A method for reproducing a digital signal, wherein said digital signal comprises a plurality of individual binary pulses arranged in groups of one or more such pulses whereby said pulses define run lengths, comprising steps of:
   (1) determining the deviation between each of said run lengths of the reproduced signal and the corresponding run length of said digital signal prior to reproduction of the digital signal,
   (2) storing said deviations,
   (3) producing a signal derived from said reproduced signal, and
   (4) processing said derived signal by combining run lengths of said derived signal with corresponding previously stored deviations.

2. The method of claim 1, wherein said step (3) is performed by detecting the rising and falling edges of each of said run lengths.

3. The method of claim 1, wherein said step (3) is performed by integration.

4. The method of claim 1, wherein said step (3) is performed by differentiation.

5. The method of claim 1, wherein with the particular single pulse of the reproduced binary signal are associated run length deviations, which correspond to the run length of one or more preceding and/or succeeding single pulses.

6. The method of claim 1, determining the run length of the reproduced signal using a test frequency, using the result of this last mentioned determination to quantify said run length, and relating the magnitude of said test frequency to the speed of the recording support used in reproducing said digital signal.

7. The method of claim 1, and decoding the reproduced binary signal using a frequency whose magnitude is dependent upon the speed of the recording support used in reproducing said digital signal.

8. The method of claim 7, wherein said decoding step takes place by direct conversion of all bit cells of a run length jointly into a sequence of identical bit signals.

9. The method of claim 1, wherein said determining step including a step of measuring said run length deviations.

10. The method of claim 1, wherein said determining step including a step of calculating said run lengths deviations.

11. The method of claim 1, wherein the storing step including the using, comprising at least one memory for storing said deviations, and registers are associated with said memory, whose number corresponds to the number of those single pulses whose deviations are to be taken into consideration during the correction of said run lengths and a unit in which the reproduced signal can be corrected in the corresponding deviation or deviations.

12. A method according to claim including a step of connecting the upstream of said registers for preceding single pulses and connecting the downstream of the registers for following single pulses.

13. A method according to claim 11, including a step of connecting a decoding unit downstream of said unit for correcting the run lengths of the reproduced binary signals.

14. Apparatus for reproducing a digital signal, wherein said digital signal comprises a plurality of individual binary pulses arranged in groups of one or more such pulses whereby said pulses define run lengths, comprising:
   means for determining the deviation between each of said run lengths of the reproduced signal and the corresponding run length of said digital signal prior to reproduction of the digital signal;
   means for storing said deviations;
   means for producing a signal associated with each run length; and
   means for processing said reproduced run lengths of said digital signal by combining said reproduced run lengths with corresponding previously stored deviations.

15. The apparatus of claim 14, said item (3), means for producing comprising means for detecting the rising and falling edges of each of said run lengths.

16. The apparatus of claim 14, said item (3), means for producing comprising integration means.

17. The apparatus of claim 14, said item (3), means for producing comprising differentiation means.

18. A method for reproducing a digital signal, wherein said digital signal is a binary signal comprising a plurality of single pulses defining run lengths, comprising the steps of:
   determining deviations between each run length of reproduced signals and the corresponding run length of such digital signals prior to reproduction;
   storing said deviations prior to the reproduction of digital signals to be reproduced; and
   selecting stored deviations depending on the actual run lengths of a signal to be reproduced and combining the deviations with said actual run lengths of said signal to be reproduced, for obtaining a reproduced signal with corrected run lengths.

* * * * *